United States Patent
Park et al.

(10) Patent No.: US 9,069,448 B2
(45) Date of Patent: Jun. 30, 2015

(54) FILTERING OBJECTS IN A MULTI-TENANT ENVIRONMENT

(75) Inventors: David Park, New York, NY (US); Neelav Rana, San Francisco, CA (US); Donovan Schneider, San Francisco, CA (US); Marko Koosel, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 469 days.

(21) Appl. No.: 13/089,887

(22) Filed: Apr. 19, 2011

(65) Prior Publication Data

US 2012/0144313 A1 Jun. 7, 2012

Related U.S. Application Data

(60) Provisional application No. 61/419,779, filed on Dec. 3, 2010.

(51) Int. Cl.
*G06F 3/0484* (2013.01)
*G06F 17/30* (2006.01)

(52) U.S. Cl.
CPC ........ *G06F 3/0484* (2013.01); *G06F 17/30398* (2013.01)

(58) Field of Classification Search
CPC ......... G06F 3/01; G06F 3/048; G06F 3/0481; G06F 3/0484; G06F 3/0486
USPC ....................................... 715/747
See application file for complete search history.

(56) References Cited

U.S. PATENT DOCUMENTS

| | | | |
|---|---|---|---|
| 5,421,008 A * | 5/1995 | Banning et al. | 1/1 |
| 5,428,776 A * | 6/1995 | Rothfield | 1/1 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,841,437 A * | 11/1998 | Fishkin et al. | 345/619 |
| 5,842,203 A * | 11/1998 | D'Elena et al. | 1/1 |
| 5,873,096 A | 2/1999 | Lim et al. | |
| 5,909,678 A * | 6/1999 | Bergman et al. | 1/1 |
| 5,918,159 A | 6/1999 | Fomukong et al. | |
| 5,963,938 A * | 10/1999 | Wilson et al. | 1/1 |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,285,998 B1 * | 9/2001 | Black et al. | 1/1 |

(Continued)

*Primary Examiner* — Steven B Theriault
(74) *Attorney, Agent, or Firm* — Ingrassia Fisher & Lorenz, P.C.

(57) ABSTRACT

Various techniques and procedures related to filtering objects in a virtual application within a multi-tenant system are provided. One approach involves providing a first graphical user interface element enabling indication of a first filtering criterion and a second graphical user interface element enabling indication of a second filtering criterion within the virtual application being accessed over a network from a client device. After indication of the first filtering criterion and the second filtering criterion, a filtered set of objects is identified based on the first filtering criterion and the second filtering criterion. At least a portion of the filtered set of objects may then be presented within the virtual application on a client device.

20 Claims, 9 Drawing Sheets

(56) References Cited

U.S. PATENT DOCUMENTS

| | | | |
|---|---|---|---|
| 6,295,527 B1* | 9/2001 | McCormack et al. | 1/1 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,389,380 B1* | 5/2002 | Bankes | 703/17 |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1* | 7/2004 | Subramaniam et al. | 1/1 |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,816,855 B2* | 11/2004 | Hartel et al. | 1/1 |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,615 B2* | 12/2004 | Goodwin et al. | 1/1 |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,915,308 B1* | 7/2005 | Evans et al. | 707/754 |
| 6,925,608 B1* | 8/2005 | Neale et al. | 715/763 |
| 7,003,730 B2* | 2/2006 | Dettinger et al. | 715/764 |
| 7,185,000 B1* | 2/2007 | Brown et al. | 707/718 |
| 7,340,411 B2 | 3/2008 | Cook | |
| 7,346,526 B2* | 3/2008 | Daughtrey et al. | 705/5 |
| 7,383,513 B2* | 6/2008 | Goldberg et al. | 715/763 |
| 7,395,511 B1* | 7/2008 | Robertson et al. | 715/810 |
| 7,509,591 B1* | 3/2009 | Thorn et al. | 715/853 |
| 7,580,932 B2* | 8/2009 | Plastina et al. | 1/1 |
| 7,620,655 B2 | 11/2009 | Larsson et al. | |
| 7,644,371 B2* | 1/2010 | Robertson et al. | 715/810 |
| 7,665,030 B2* | 2/2010 | Sauermann et al. | 715/777 |
| 7,698,160 B2 | 4/2010 | Beaven et al. | |
| 7,774,366 B2* | 8/2010 | Fisher et al. | 707/784 |
| 7,962,446 B2* | 6/2011 | Subramaniam et al. | 707/610 |
| 8,001,157 B2* | 8/2011 | Bier | 707/802 |
| 8,019,752 B2* | 9/2011 | Ferrari et al. | 707/722 |
| 8,024,327 B2* | 9/2011 | Tunkelang et al. | 707/722 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,140,572 B1* | 3/2012 | Ballard et al. | 707/776 |
| 8,156,205 B1* | 4/2012 | Forsberg et al. | 709/220 |
| 8,185,429 B2 | 5/2012 | Howard | 705/7.26 |
| 8,185,562 B2* | 5/2012 | Koch et al. | 707/805 |
| 8,255,791 B2* | 8/2012 | Koren | 715/227 |
| 8,275,836 B2 | 9/2012 | Beaven et al. | |
| 8,296,332 B2* | 10/2012 | Boley et al. | 707/803 |
| 8,312,038 B2* | 11/2012 | Ceballos et al. | 707/769 |
| 8,332,772 B2* | 12/2012 | Janzen et al. | 715/771 |
| 8,386,471 B2* | 2/2013 | Collins et al. | 707/716 |
| 2001/0044791 A1 | 11/2001 | Richter et al. | |
| 2001/0049681 A1* | 12/2001 | Bova | 707/10 |
| 2002/0046209 A1* | 4/2002 | De Bellis | 707/10 |
| 2002/0072951 A1 | 6/2002 | Lee et al. | |
| 2002/0078103 A1* | 6/2002 | Gorman et al. | 707/530 |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2002/0198697 A1* | 12/2002 | Datig | 704/1 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0131007 A1* | 7/2003 | Schirmer et al. | 707/100 |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0227487 A1* | 12/2003 | Hugh | 345/777 |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0015368 A1* | 1/2005 | Payton et al. | 707/4 |
| 2005/0050555 A1 | 3/2005 | Exley et al. | |
| 2005/0091098 A1 | 4/2005 | Brodersen et al. | |
| 2006/0026145 A1* | 2/2006 | Beringer et al. | 707/3 |
| 2006/0224959 A1* | 10/2006 | McGuire et al. | 715/700 |
| 2007/0106639 A1* | 5/2007 | Subramaniam et al. | 707/3 |
| 2007/0118844 A1* | 5/2007 | Huang et al. | 719/330 |
| 2007/0157173 A1* | 7/2007 | Klein et al. | 717/122 |
| 2007/0208697 A1* | 9/2007 | Subramaniam et al. | 707/3 |
| 2007/0208992 A1* | 9/2007 | Koren | 715/503 |
| 2007/0260593 A1 | 11/2007 | Delvat | 707/4 |
| 2007/0260628 A1* | 11/2007 | Fuchs et al. | 707/101 |
| 2009/0007021 A1* | 1/2009 | Hayton | 715/843 |
| 2009/0031236 A1* | 1/2009 | Robertson et al. | 715/765 |
| 2009/0157669 A1 | 6/2009 | Nakayama et al. | |
| 2009/0282045 A1* | 11/2009 | Hsieh et al. | 707/9 |
| 2009/0307604 A1* | 12/2009 | Giles et al. | 715/751 |
| 2010/0218134 A1* | 8/2010 | B'Far et al. | 715/780 |
| 2011/0078085 A1* | 3/2011 | Clement | 705/313 |
| 2011/0225506 A1* | 9/2011 | Casalaina et al. | 715/741 |
| 2011/0225525 A1* | 9/2011 | Chasman et al. | 715/763 |
| 2012/0110087 A1* | 5/2012 | Culver et al. | 709/205 |
| 2012/0144325 A1* | 6/2012 | Mital et al. | 715/763 |
| 2012/0216225 A1* | 8/2012 | Britt | 725/32 |

* cited by examiner

FIG. 9

| Opportunity Owner ↑ | Type | Lead Source | Close Date | Next Step | Probability (%) | Fiscal Period |
|---|---|---|---|---|---|---|
| Admin User | New Business | Advertisement | 12/14/2006 | Close the deal! | 25% | Q4-2006 |
| Admin User | Existing Business | Partner | 2/11/2007 | Meet at Widget Conference | 50% | Q1-2007 |
| Admin User | Existing Business | Trade Show | 12/14/2006 | Need estimate | 20% | Q4-2006 |
| Admin User | New Business | Trade Show | 2/9/2007 | Need estimate | 20% | Q1-2007 |
| Admin User | Existing Business | Word of mouth | 4/14/2007 | Need estimate | 25% | Q2-2007 |
| Admin User | New Business | Advertisement | 11/11/2006 | Closed! | 100% | Q4-2006 |
| Admin User | New Business | Advertisement | 11/11/2006 | Closed! | 100% | Q4-2006 |
| Admin User | Existing Business | Advertisement | 11/11/2006 | Closed! | 100% | Q4-2006 |
| Admin User | New Business | Partner | 1/12/2007 | - | 100% | Q1-2007 |

Filters: Add
Opportunities without Activities
  Task equals "True"

Preview Tabular Format ▼ Show ▼ Remove All Columns

Grand Totals (9 records)

FILTERING OBJECTS IN A MULTI-TENANT ENVIRONMENT

CROSS-REFERENCE TO RELATED APPLICATION(S)

This application claims the benefit of U.S. provisional patent application Ser. No. 61/419,779, filed Dec. 3, 2010, the entire content of which is incorporated by reference herein.

TECHNICAL FIELD

Embodiments of the subject matter described herein relate generally to systems and processes that use a common network-based platform to support applications executing on behalf of multiple tenants, and more particularly, embodiments of the subject matter relate to techniques, protocols, methodologies, and related graphical user interfaces for filtering objects within a virtual application.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

In certain situations, a user or operator of a client device accessing a virtual application in the multi-tenant system might desire to view a certain subset of the objects within that virtual application that the user has access to by filtering the objects using multiple filtering criteria. However, traditional systems lack developed filtering mechanisms, and in some situations, may require the user manually filter the objects in the desired manner, thereby making the desired filtering cumbersome or otherwise impractical.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 3-9 illustrate a sequence of displays presented by a virtual application in the multi-tenant system in connection with the object filtering process of FIG. 2 in accordance with one or more exemplary embodiments.

DETAILED DESCRIPTION

The exemplary embodiments presented here relate to various techniques for filtering objects and related graphical user interfaces to support such filtering that can be implemented in the context of any computer-implemented system, such as a software-based system, a database system, a multi-tenant environment, or the like. Moreover, the described subject matter could be implemented in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

Figure 1:
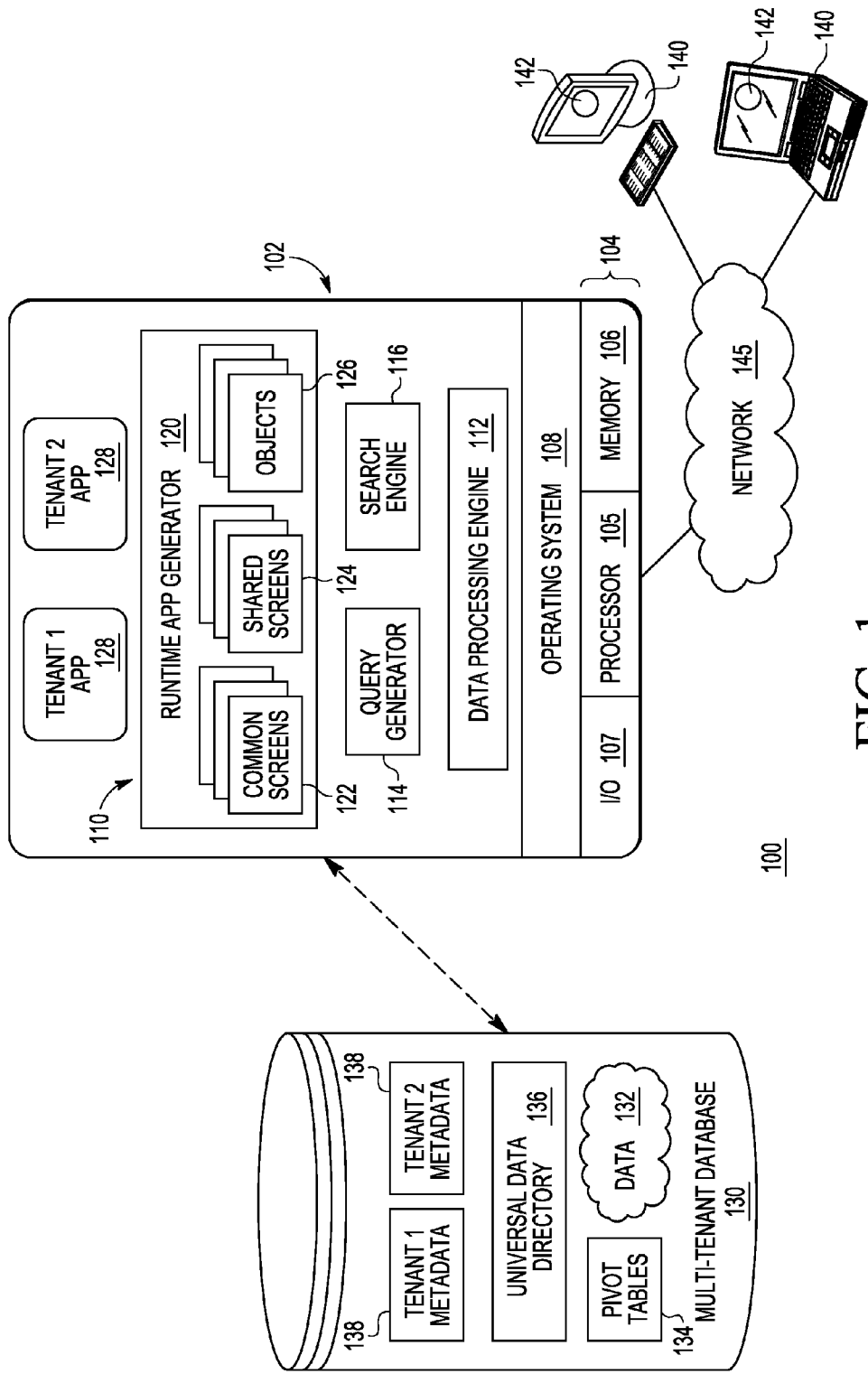
FIG. 1 is a block diagram of an exemplary multi-tenant system.

Turning now to FIG. 1, an exemplary multi-tenant system 100 suitably includes a server 102 that dynamically creates virtual applications 128 based upon data 132 from a common database 130 that is shared between multiple tenants. Data and services generated by the virtual applications 128 are provided via a network 145 to any number of client devices 140, as desired. Each virtual application 128 is suitably generated at run-time using a common application platform 110 that securely provides access to the data 132 in the database 130 for each of the various tenants subscribing to the multi-tenant system 100. In accordance with one non-limiting example, the multi-tenant system 100 may be implemented in the form of a multi-tenant CRM system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

The data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The server 102 typically includes or cooperates with some type of computer-readable media, where a tangible computer-readable medium has computer-executable instructions stored thereon. The computer-executable instructions, when read and executed by the server 102 and/or processor 105, cause the server 102 and/or processor 105 to perform certain tasks, operations, functions, and processes described in more detail herein. In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the client devices 140. The virtual applications 128 are typically generated at run-time in response to queries received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith. In an exemplary embodiment, each object type includes one or more fields for indicating the relationship of a respective object of that object type to one or more objects of a different object type (e.g., master-detail, lookup relationships, or the like). For example, in a CRM application, the opportunity object type includes one or more fields for indicating which objects of other object types (e.g., accounts, activities, or the like, along with custom and/or tenant-specific object types) are associated with a respective opportunity object. In other words, the opportunity object type includes one or more fields indicating which, if any, objects of other object types are associated that respective opportunity object. For convenience, but without limitation, the field(s) of an object type that indicates the relationship(s) of a respective object of that object type to objects of other object types may alternatively be referred to herein as the object-association field(s).

As described in greater detail below in the context of FIGS. 2-9, in exemplary embodiments, the application platform 110, the data processing engine 112, the query generator 114, and the processor 105 cooperate in an appropriate manner to filter the objects 126 associated with a virtual application 128 after indication or selection of a desired filtering operation and various filtering criteria by a user of a client device 140 accessing the virtual application 128, display at least a portion of the filtered set of objects 126 within the virtual application 128 on the client device 140, and perform additional techniques, processes, and methods to support filtering the objects 126 in the multi-tenant application system 100. In exemplary embodiments, the object-association field(s) are utilized to filter objects 126 based on their association (or a lack thereof) with other objects 126 of a particular object type selected by a user of the client device 140 to generate a report containing a filtered subset of the objects 126 available to the particular user that is provided to and/or displayed on the client device 140.

Still referring to FIG. 1, the data and services provided by the server 102 can be retrieved using any sort of personal computer, mobile telephone, tablet or other network-enabled client device 140 on the network 145. Typically, the user operates a conventional browser or other client program 142 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the client device 140; other embodiments may simply provide dynamic web or other content that can be presented and viewed by the user, as desired.

Figure 2:
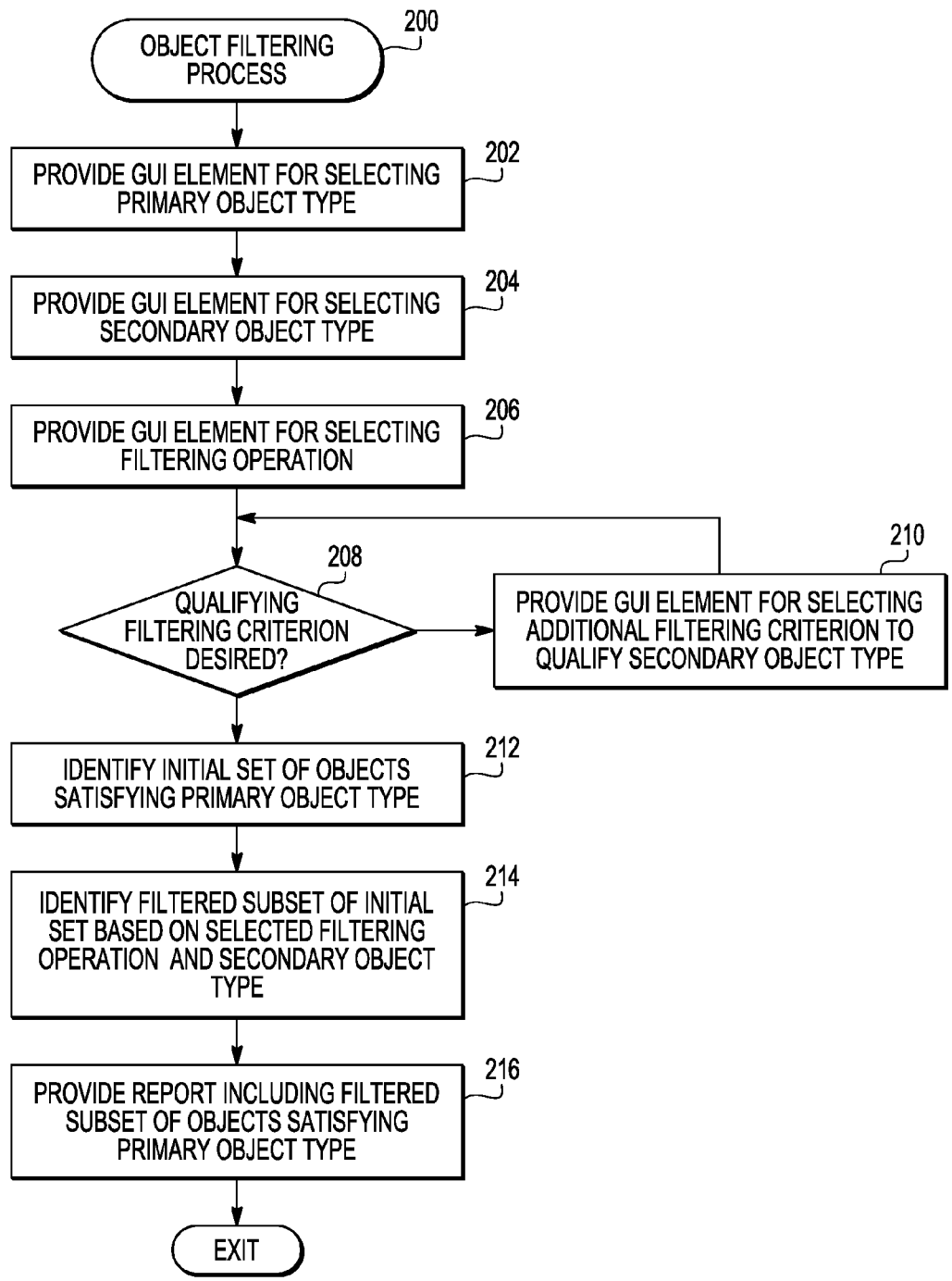
FIG. 2 is a flow diagram that illustrates an exemplary object filtering process suitable for use with the multi-tenant system of FIG. 1.

FIG. 2 is a flow chart that illustrates an exemplary embodiment of an object filtering process 200 suitable for implementation by a multi-tenant application system, such as multi-tenant application system 100. The various tasks performed in connection with an illustrated process may be performed by software, hardware, firmware, or any combination thereof. For illustrative purposes, the following description of illustrated processes may refer to elements mentioned above in connection with FIG. 1. In practice, portions of the object filtering process 200 may be performed by different elements of the multi-tenant application system 100, e.g., the processor 105, the application platform 110, the data processing engine 112, the query generator 114, a virtual application 128, the database 130, a client device 140, or any functional or operating module thereof. It should be appreciated that the object filtering process 200 may include any number of additional or alternative tasks, the tasks need not be performed in the illustrated order and/or the tasks may be performed concurrently, and/or the object filtering process 200 may be incorporated into a more comprehensive procedure or process having additional functionality not described in detail herein. Moreover, one or more of the tasks shown and described in the context of FIG. 2 could be omitted from an embodiment of the respective process as long as the intended overall functionality remains intact.

Referring now to FIGS. 1-2, in an exemplary embodiment, the object filtering process 200 is initiated by a user of a client device 140 within a virtual application 128 to generate a report that includes a subset of the data 132 available to that user (or tenant) that is filtered based on the filtering criteria and filtering operations selected, indicated or otherwise provided by the user. In this regard, the object filtering process 200 may begin in response to the virtual application 128 receiving an instruction or a command from the user of the client device 140. For example, as described in greater detail below in the context of FIG. 3, the virtual application 128 may provide, present, or otherwise display a graphical user interface (GUI) element (e.g., a button or the like) within the virtual application 128 being presented on a client device 140 via client program 142) that is adapted to allow a user to select or otherwise initiate the object filtering process 200. The filtering operation performed by object filtering process 200 may alternatively be referred to herein for convenience, but without limitation, as cross filtering, a cross filter, or a variant thereof.

Referring again to FIG. 2, and with continued reference to FIG. 1, in an exemplary embodiment, the object filtering process 200 begins by providing, presenting, or otherwise displaying a GUI element to enable a user to indicate or otherwise select a primary filtering criterion from a first set of possible filtering criteria for filtering the objects associated with a virtual application (task 202). For example, in an exemplary embodiment, the object filtering process 200 presents or otherwise displays, within the virtual application 128, a GUI element adapted to allow a user to select a primary object type from the possible object types associated with the virtual application 128 being accessed by the client device 140. In this regard, the application platform 110 and/or processor 105 may be cooperatively configured to cause a GUI element, such as a drop-down list or the like, that is adapted to allow selection among multiple possible filtering criteria to be presented or otherwise displayed on the client device 140 that initiated the object filtering process 200 at an appropriate location within the client program 142 as part of the virtual application 128. A user of the client device 140 may manipulate or otherwise interact with the GUI element to select or otherwise indicate the desired primary filtering criterion from a list of possible primary filtering criteria, as described in greater detail below in the context of FIG. 4.

Still referring to FIG. 2, in an exemplary embodiment, the object filtering process 200 also provides, presents, or otherwise displays a second GUI element to enable a user to indicate or otherwise select a secondary filtering criterion from a second set of possible filtering criteria for filtering the objects associated with the virtual application (task 204). As described in greater detail below, the second set of filtering criteria is influenced by the primary filtering criterion selected by the user and is different from the first set of filtering criteria selected from when designating the primary filtering criterion. For example, in one embodiment, where the selected primary filtering criterion is a primary object type, the object filtering process 200 identifies the possible object types capable of being associated with the selected primary object type (e.g., based on the object-association fields of the selected primary object type) and presents or otherwise displays, on the client device 140, a second GUI element adapted to allow a user to select a secondary object type from the possible object types capable of being associated with an object of the selected primary object type. In a similar manner as set forth above, the application platform 110 and/or processor 105 may be cooperatively configured to cause a second GUI element, such as a drop-down list or the like, that is adapted to allow selection among multiple secondary filtering criteria to be presented or otherwise displayed within the virtual application 128 on the client device 140. A user of the client device 140 may manipulate or otherwise interact with the second GUI element to select or otherwise indicate the desired secondary filtering criterion from a list of possible secondary filtering criteria, as described in greater detail below in the context of FIGS. 4-6.

Additionally, the object filtering process 200 also provides, presents, or otherwise displays a third GUI element to enable a user to indicate or otherwise select a desired filtering operation from a plurality of possible filtering operations (task 206). In this regard, the selected filtering operation defines the relationship or association between the secondary filtering criterion to the primary filtering criterion that will be applied to each of the objects 126 of the virtual application 128 that are accessible to the user of the client device 140 to obtain the filtered set of objects. For example, in accordance with one or more embodiments, the application platform 110 and/or processor 105 are cooperatively configured to cause a third GUI element, such as a drop-down list or the like, that is adapted to allow selection between an associative filtering operation and a dissociative filtering operation within the virtual application 128 on the client device 140, as described in greater detail below in the context of FIGS. 4-5. In this regard, an associative filtering operation, alternatively referred to herein as a "with" filtering operation, filters the objects associated with the virtual application 128 to identify a filtered subset of objects satisfying the primary filtering criterion that are associated with one or more other objects of the virtual application 128 that satisfy the secondary filtering criterion. Conversely, a dissociative filtering operation, alternatively referred to herein as a "without" filtering operation, filters the objects associated with the virtual application 128 to identify a filtered subset of objects satisfying the primary filtering criterion that are not associated with another object of the virtual application 128 that satisfies the secondary filtering criterion.

In an exemplary embodiment, after selection of the desired filtering criteria and the desired filtering operation, the object filtering process 200 continues by determining whether a user desires to utilize one or more additional filtering criteria associated with the selected secondary filtering criterion to qualify the secondary filtering criterion (task 208). For example, as described in greater detail below in the context of FIGS. 6-8, the application platform 110 and/or processor 105 may be cooperatively configured to cause a GUI element, such as a button or the like, adapted to allow a user to add additional filtering criteria associated with the secondary filtering criterion that qualify or otherwise limit the secondary filtering criterion. In response to receiving indication that additional filtering criteria are desired, the object filtering process 200 provides, presents, or otherwise displays additional GUI elements to enable qualifying the secondary filtering criterion until no additional qualifying filtering criteria are desired (task 210), as described in greater detail below.

Still referring to FIG. 2, in an exemplary embodiment, the object filtering process 200 identifies or otherwise determines the objects of the virtual application that satisfy the primary filtering criterion (task 212). In this regard, the application platform 110 and query generator 114 are cooperatively configured to query the database 130 and identify the subset of objects 126 of the virtual application 128 that satisfy the primary filtering criterion by selecting, from all of the possible objects 126 available to the respective virtual application 128 that are maintained in the database 130, those objects which satisfy the primary filtering criterion. For example, in accordance with one or more embodiments, the application platform 110 and query generator 114 may query the database 130 and select, from all of the possible objects 126 available to the respective virtual application 128 that are maintained in the database 130, each respective object that is of the primary object type for inclusion in the initial subset of the objects 126 associated with the virtual application 128.

In some embodiments, the object filtering process 200 may automatically identify the subset of the objects 126 associated with the virtual application 128 in response to receiving indication of the primary filtering criterion (e.g., automatically in response to the user selecting the desired primary filtering criterion). In other embodiments, the object filtering process 200 may identify the subset of the objects 126 associated with the virtual application 128 that satisfy the primary filtering criterion only in response to determining that a user does not desire to further qualify the selected secondary filtering criterion. For example, as described in greater detail below in the context of FIGS. 3-9, the application platform 110 and/or processor 105 may be cooperatively configured to cause a GUI element, such as a button or the like, to be displayed within the virtual application 128 that may be activated, manipulated, or otherwise selected by a user to cause the query generator 114 and/or data processing engine 112 to begin filtering the objects 126 using the selected filtering criteria. In this regard, after a user has manipulated the other GUI elements to select or otherwise indicate the desired primary filtering criterion, the desired secondary filtering criterion, the desired filtering operation, and any additional filtering criterion to qualify the secondary filtering criterion, the user may select the GUI element to complete execution of the object filtering process 200 to filter the objects in accordance with the selected filtering criteria and the selected filtering operation.

After identifying an initial subset of the objects associated with the virtual application that satisfy the primary filtering criterion, the object filtering process 200 continues by identifying a subset of the initial subset of objects based on the selected filtering operation, the selected secondary filtering criterion, and any qualifying filtering criteria for the secondary filtering criterion (task 214). As described above, when an associative filtering operation is selected by the user, the application platform 110 and query generator 114 filters the initial subset of objects to identify any objects satisfying the primary filtering criterion that are also associated with one or more other objects of the virtual application 128 that satisfy the secondary filtering criterion. Conversely, when a dissociative filtering operation is selected by the user, the application platform 110 and query generator 114 filters the initial subset of objects and removes any objects satisfying the primary filtering criterion that are also associated with one or more other objects of the virtual application 128 that satisfy the secondary filtering criterion. For example, as described above and in greater detail below, the primary filtering criterion may be a primary object type and the secondary filtering criterion may be secondary object type from a plurality of possible object types that may be associated with objects of the primary object type. If the user selected a dissociative filtering operation, the application platform 110 and query generator 114 are cooperatively configured to remove, from the initial subset of objects of the primary object type, each respective object that is associated with an object of the secondary object type to obtain the filtered set of objects of the primary object type. Conversely, if the user selected an associative filtering operation, the application platform 110 and query generator 114 are cooperatively configured to identify or otherwise select, from the initial subset of objects of the primary object type, each respective object that is associated with an object of the secondary object type to obtain the filtered set of objects of the primary object type.

As described above, in some embodiments, a user may select additional filtering criterion associated with the secondary filtering criterion to qualify the secondary filtering criterion (tasks 208, 210). For example, in response to a user selecting a GUI element to indicate a desire to add an additional filtering criterion associated with the secondary filtering criterion, the object filtering process 200 may cause a GUI element, such as a drop-down list or the like, to be presented or otherwise displayed within the virtual application 128 on the client device 140 that enables selection of a field associated with the selected secondary object type to be used to qualify the secondary object type. The object filtering process 200 may also display, present, or otherwise provide one or more GUI elements adapted to allow the user to specify or otherwise limit values for the selected field to a particular value or a range thereof. After a user has indicated the desired value (or range thereof) for the selected field, the object filtering process 200 identifies the filtered set of objects satisfying the selected primary filtering criterion based on the selected secondary filtering criterion taking into account the qualifying filtering criterion (task 214). For example, as described in greater detail below, the qualifying filtering criterion may be a specific value (or a range thereof) for a field associated with the selected secondary object type that may be associated with objects of the primary object type. When an associative filtering operation is selected by the user, the application platform 110 and query generator 114 filters the initial subset of objects and selects objects of the primary object type that are associated with an object of the secondary object type having a value for the selected field that is equal to the specified value for the selected field (or within the specified range of values for the selected field) to create the filtered set of objects having the primary object type. Conversely, when a dissociative filtering operation is selected by the user, the application platform 110 and query generator 114 filters the initial subset of objects and removes any object that are associated with an object of the secondary object type having a value for the selected field that is equal to the specified value for the selected field (or within the specified range of values for the selected field) to create the filtered set of objects having the primary object type.

Still referring to FIG. 2, in an exemplary embodiment, after identifying the filtered set of objects, the object filtering process 200 provides, presents, or otherwise displays a report within the virtual application on the client device that includes at least a portion of the filtered set of objects (task 216). In this regard, the report is a graphical representation of the filtered set of objects, such as a table, list, chart, or other collection of the filtered set of objects that is presented within the virtual application 128 and thereby displayed on the client device 140. In this manner, the filtered set of objects is presented to the user that initiated the object filtering process 200 and selected the filtering criteria and filtering operation that were utilized to arrive at the filtered set of objects.

FIGS. 3-9 illustrate an exemplary sequence of a display 300 graphically presented by a virtual application 128 within a client program 142 executing on a client device 140 within the multi-tenant system 100 of FIG. 1 in connection with an exemplary embodiment of the object filtering process 200 of FIG. 2. In this regard, the display 300 illustrated in FIGS. 3-9 represents a portion of the visual area on the client device 140 that contains graphical representations or images associated with the client program 142 which generates, conveys, renders, or otherwise displays graphical representations or images based on data received from the virtual application 128. In practice, the display 300 may be realized as or otherwise derived from one or more screens 122, 124 integrated with or otherwise supported by the virtual application 128.

Figure 3:
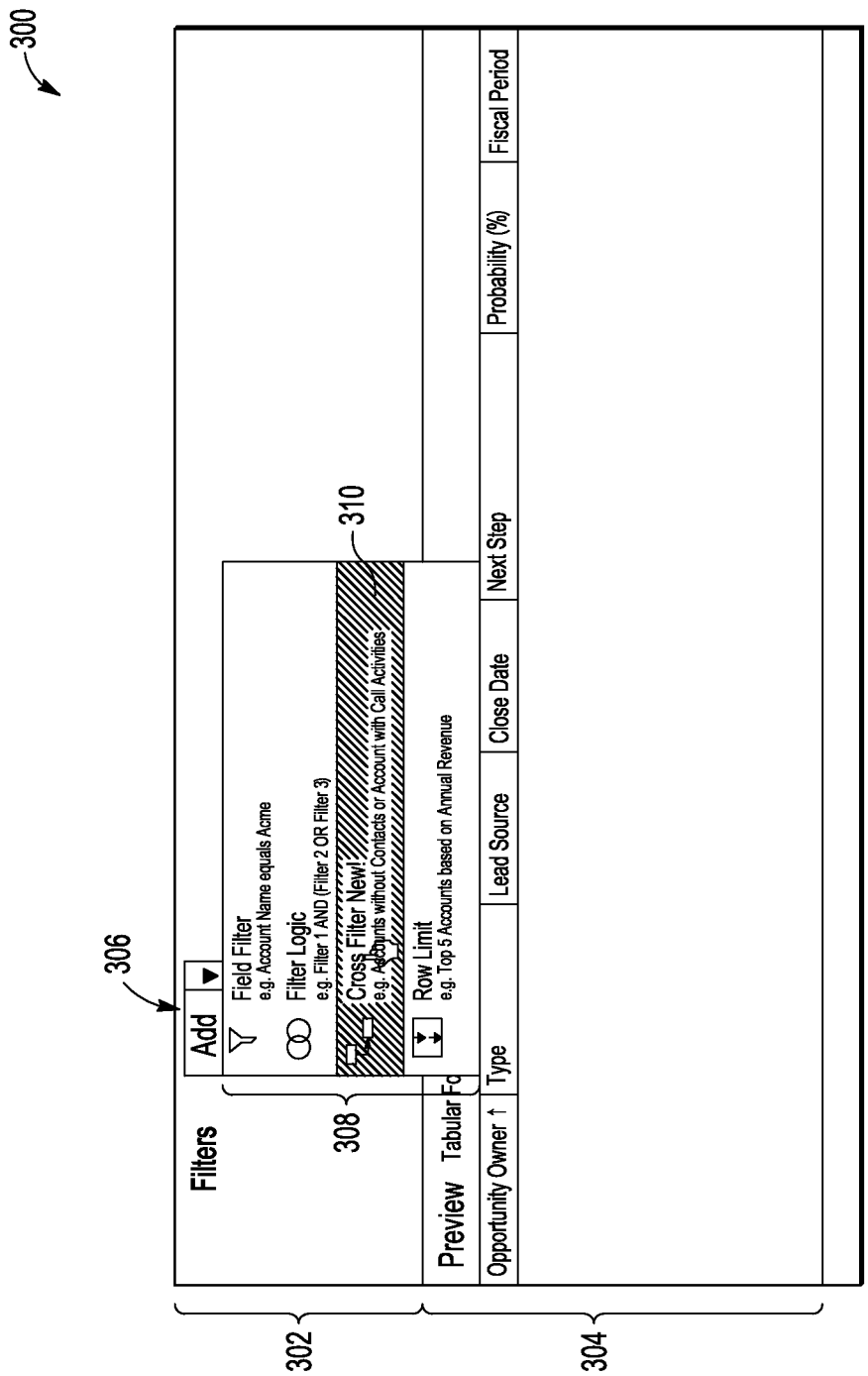

As illustrated in FIG. 3, in an exemplary embodiment, the display 300 is divided or otherwise partitioned into an upper portion 302 that contains one or more GUI elements for filtering the objects 126 associated with the respective virtual application 128, and a lower portion 304 for presenting a report that includes the cross filtered set of objects 126, as described in greater detail below in the context of FIG. 9. In the illustrated embodiment, the upper portion 302 includes a GUI element 306, such as a button or dropdown list, that enables a user to create a filter to be utilized in generating a report. After receiving indication of a desire to add a filter (e.g., in response to a user selecting or otherwise manipulating the button 306), the virtual application 128 may present or otherwise display a menu 308 that includes a plurality of possible filter types, wherein one possible filter type 310 of the possible filter types corresponds to the object filtering process 200 described above. In response to receiving indication of a desire to cross filter the objects 126 of the virtual application 128 in accordance with the object filtering process 200 described above (e.g., in response to a user selecting the cross filter 310 from the menu 308), the virtual application 128 initiates the object filtering process 200.

Figure 4:
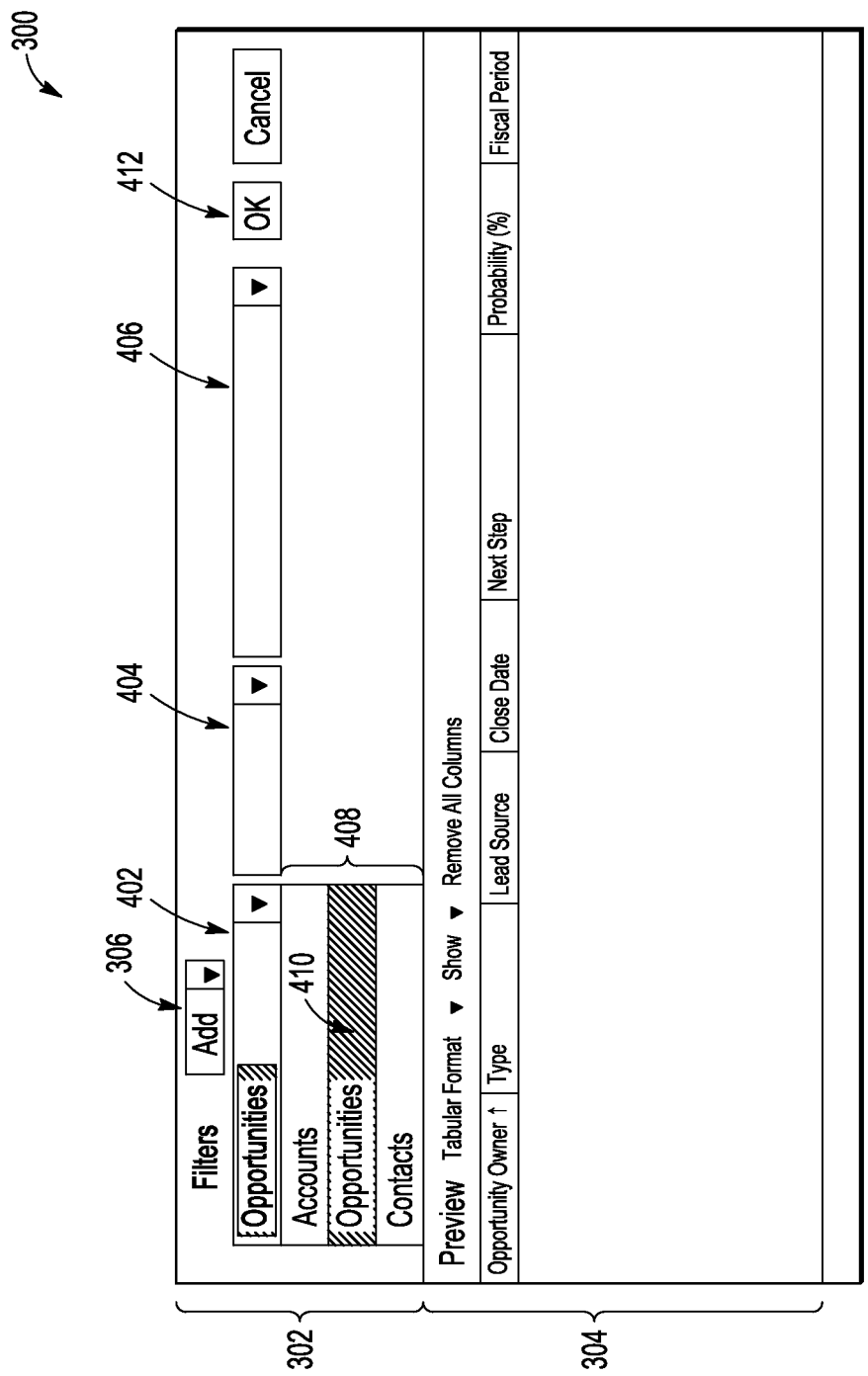
Figure 5:
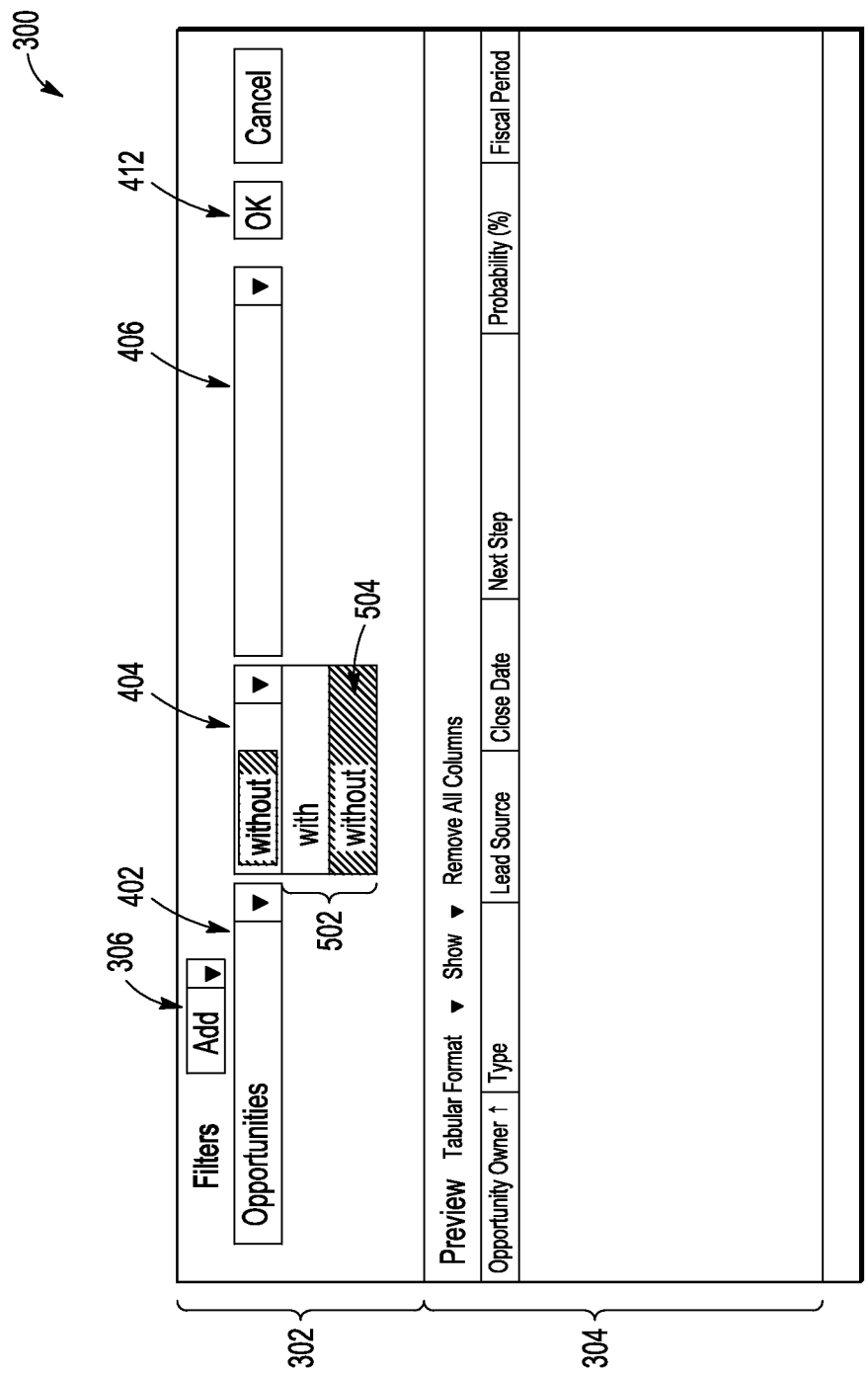
Figure 6:
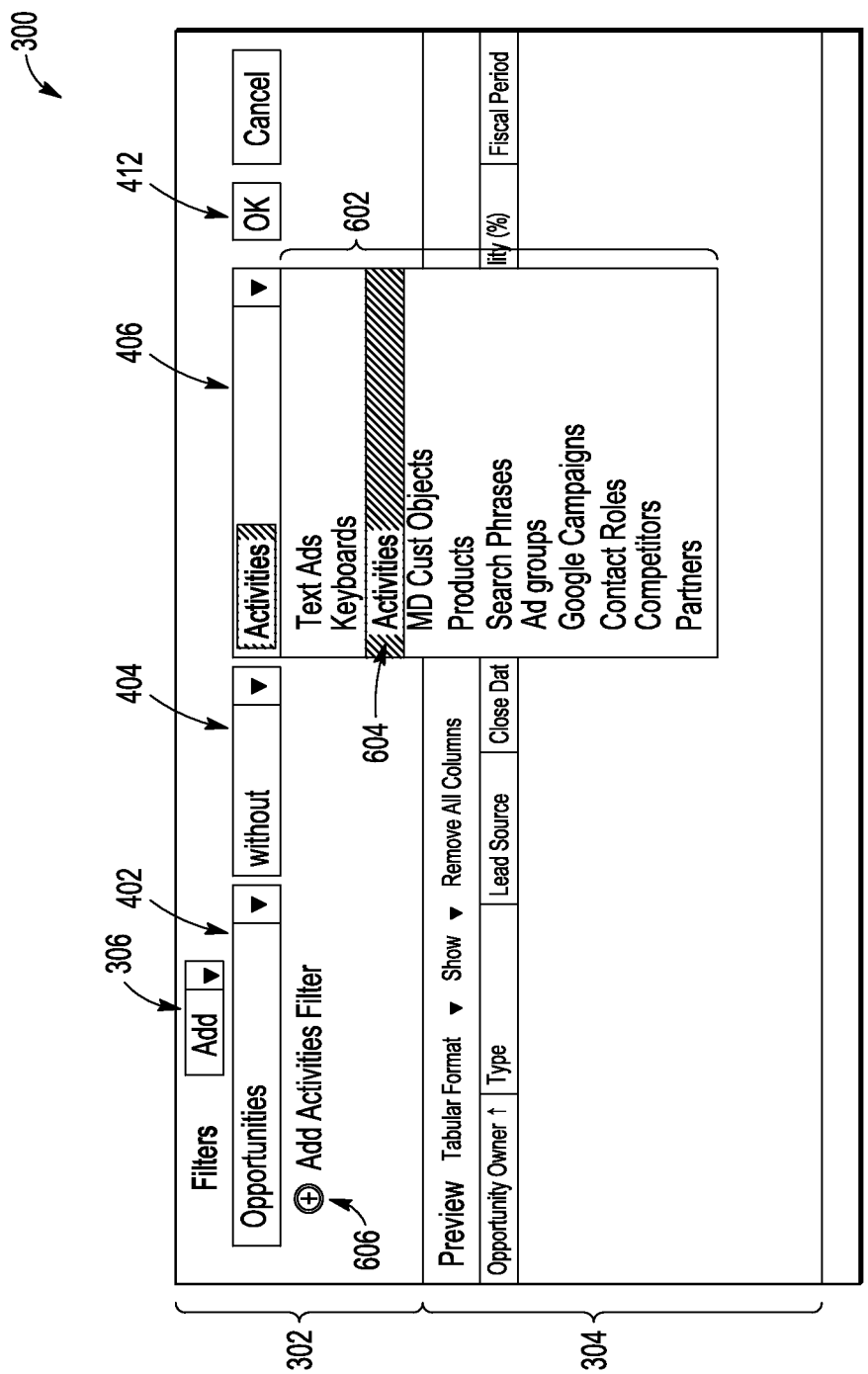

Referring now to FIGS. 4-6, in response to receiving indication of a desire to begin the object filtering process 200, the virtual application 128 presents or otherwise displays a first GUI element 402, such as a drop-down list or the like, for selecting a primary filtering criterion from a plurality of possible filtering criteria, which in this example is a primary object type from a plurality of possible object types for the objects 126 associated with the virtual application 128 (e.g., task 202). Additionally, the virtual application 128 presents or otherwise displays a second GUI element 404 for selecting a desired filtering operation, and a third GUI element 406 for selecting a secondary filtering criterion from a plurality of possible filtering criteria associated with the primary filtering criterion, which in this example is secondary object type from a plurality of possible object types for the objects 126 associated with the virtual application 128 that may be associated with the selected primary object type (e.g., tasks 204, 206).

As illustrated in FIG. 4, in response a user manipulating, activating, or otherwise selecting the drop-down list element 402, the virtual application 128 presents or otherwise displays a drop-down menu 408 that lists each of the possible types of objects 126 supported by the virtual application 128 that may be used as the primary object type. For example, in a virtual CRM application, the drop-down menu 408 may list each of the different types of objects supported by the application, such as "accounts," "opportunities," "contacts," or the like. In this regard, FIG. 4 illustrates the state of the display 300 after a user has manipulated the drop-down list 402 to select or otherwise indicate the desired primary object type 410 (e.g., "opportunities") from the drop-down menu 408 as the desired primary object type. It should be noted that in other embodiments, the primary object type drop-down menu also includes or otherwise lists any custom objects created or otherwise defined by a tenant within the application (i.e., tenant-specific objects). Additionally, in some embodiments, the list of possible primary object types may disable or otherwise exclude one or more object types based on the security settings for the user of the client device 140 filtered based on the user's security settings within the virtual application 128. For example, if the security settings for the user of the client device 140 prevents the user from accessing account objects, then "accounts" either would not be displayed in the drop-down menu or would not be selectable by the user.

As illustrated in FIGS. 4-8, the virtual application 128 may update the drop-down list element 402 to identify the selected primary object type after it is selected. It should be noted that in other embodiments, a user may indicate the primary object type by manually entering the desired primary object type using the text field of the drop-down list element 402 (e.g., by typing the primary object type) rather than utilizing the drop-down menu 408. In some embodiments, in response to the user indicating or selecting the primary object type, the data processing engine 112 and/or query generator 114 may automatically query the database 130 and select all of the "opportunities" from among of the possible objects 126 available to the virtual application 128 by selecting each object 126 matching the "opportunity" object type. Furthermore, in such embodiments, after identifying all of the "opportunities" available to the virtual application 128, the application platform 110 and/or virtual application 128 may dynamically update the lower portion 304 of the display 300 to present or otherwise display some or all of the identified "opportunities" in the lower portion 304.

Turning now to FIG. 5, after indicating the primary object type using drop-down list 402, a user may manipulate the drop-down list element 404 to indicate a desired filtering operation 504 from a drop-down menu 502 that lists the associative filtering operation ("with") and the dissociative filtering operation ("without") as possible filtering operations. In this regard, FIG. 5 illustrates the state of the display 300 after a user has manipulated the drop-down list element 404 to select or otherwise indicate the dissociative filtering operation 504 (or "without" filtering operation) in the drop-down menu 502 as the desired filtering operation.

Figure 7:
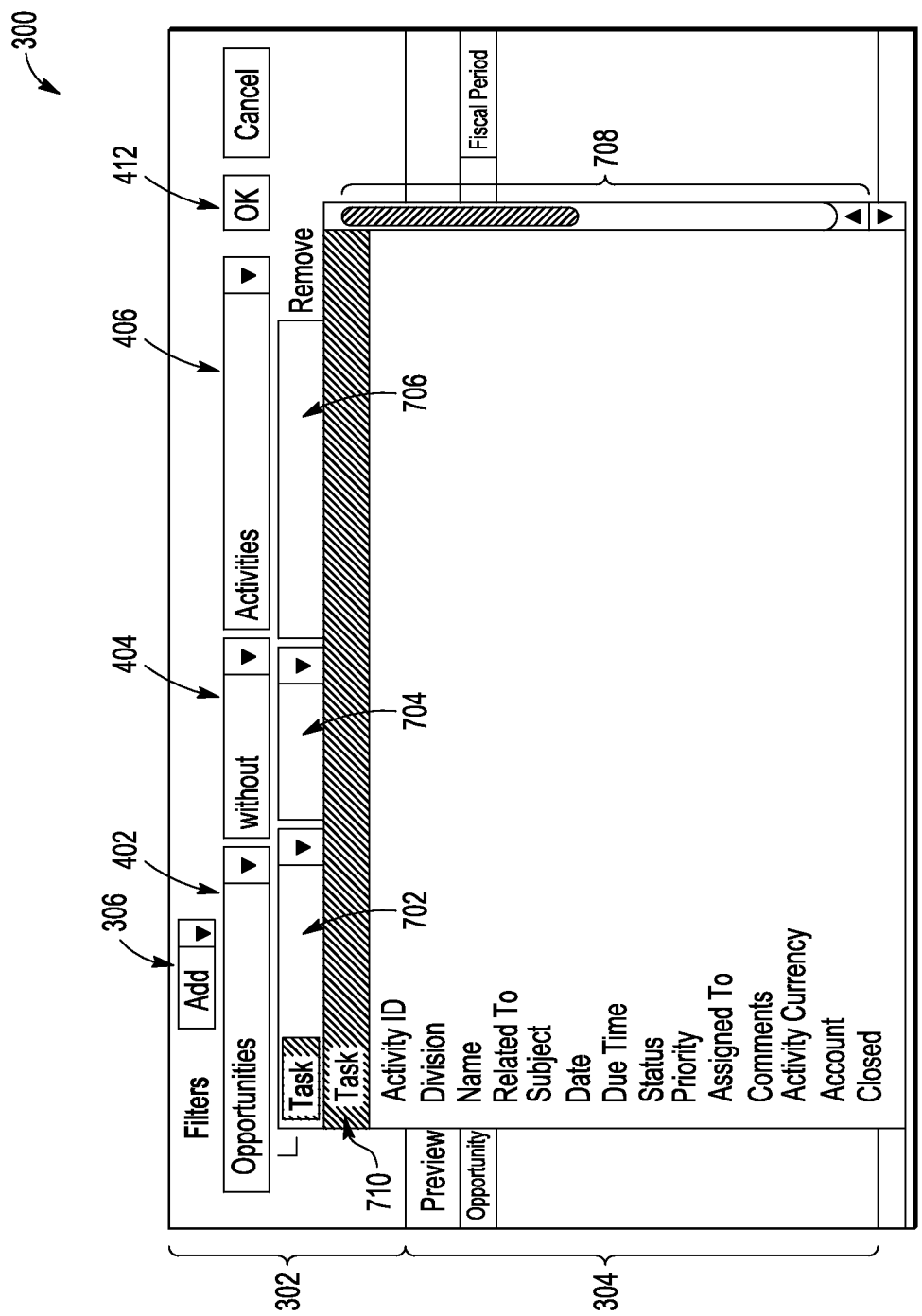
Figure 8:
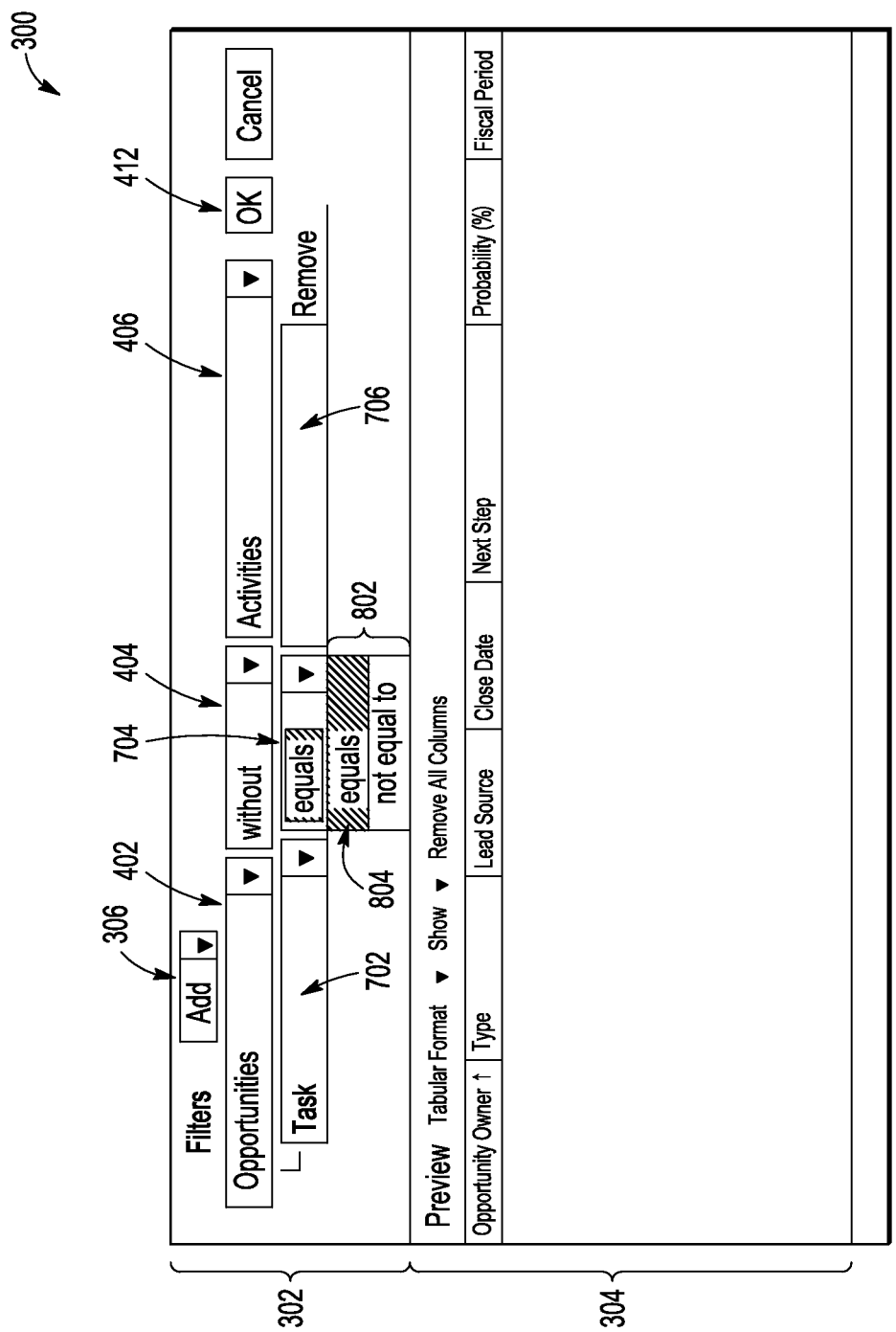

As illustrated in FIG. 6, in response a user manipulating, activating, or otherwise selecting the drop-down list element 406, the virtual application 128 presents or otherwise displays a drop-down menu 602 that lists each of the possible types of objects 126 that may be associated with the primary object type, in this case "opportunities" objects, for use as the secondary filtering criterion. In this regard, FIG. 6 illustrates the state of the display 300 after a user has manipulated the drop-down list 406 to select or otherwise indicate "activities" objects 604 from the drop-down menu 602 as the desired secondary object type. As illustrated in FIGS. 6-8, the virtual application 128 may update the drop-down list element 406 to identify the selected secondary object type after it is selected. Additionally, as described above, it will be appreciated that in other embodiments, a user may indicate the secondary object type by manually entering the desired secondary object type using the text field of the drop-down list element 402 (e.g., by typing the secondary object type) rather than utilizing the drop-down menu 602. In an exemplary embodiment, in response to indication of the desired secondary object type, the virtual application 128 and/or application platform 110 automatically presents or otherwise displays a GUI element 606, such as a button, that is adapted to allow a user to add additional qualifying filtering criterion associated with the selected secondary object type, as described in greater detail below in the context of FIGS. 7-9.

As described above, in some embodiments, a user may not desire to use any additional qualifying filtering criteria for the secondary object type (e.g., task 210). In this regard, as illustrated, the application platform 110 and/or virtual application 128 may present a GUI element 412, such as a button, that when activated, selected, or otherwise manipulated, causes the application platform 110 and/or virtual application 128 to complete the object filtering process 200 by identifying the filtered set of objects using the selected filtering operation with the primary and secondary object types and providing a report containing the filtered set to the user (e.g., tasks 212, 214, 216). For example, in response to receiving indication of a desire to complete the object filtering process 200 without any additional qualifying filtering criteria (e.g., in response to a user manipulating or otherwise selecting button 412), the data processing engine 112 and/or query generator 114 query the database 130 to identify or otherwise select all of the "opportunity" objects available to the virtual application 128 that are not associated with an "activity" object to create the filtered set of "opportunity" objects. In some embodiments, the data processing engine 112 and/or query generator 114 may identify all of the "opportunity" objects available to the virtual application 128 to obtain an initial set of "opportunity" objects, and then remove any "opportunity" objects that are associated with an "activity" object to obtain the filtered set of "opportunity" objects. After evaluating all of the objects 126 available to the virtual application 128 to obtain the filtered set of objects, the application platform 110 and/or virtual application 128 provides a report to the user by presenting or otherwise displaying a table, list, or the like, in the lower portion 304 of the display 300 that includes only those "opportunity" objects that are not associated with an "activity" object 126. Conversely, if the user were to select the associative filtering operation (e.g., the "with" filtering operation) as the desired filtering operation instead of the dissociative filtering operation (e.g., the "without" filtering operation), the data processing engine 112 and/or query generator 114 would query the database 130 identify all of the "opportunity" objects available to the virtual application 128 that are associated with an "activity" object for inclusion in the filtered set of "opportunity" objects, which would then be presented in the lower portion 304 of the display 300.

Referring now to FIG. 7-9, as described above, in some embodiments, a user may desire to use additional filtering criteria to qualify the secondary object type (e.g., tasks 208, 210). In this regard, in response to receiving indication of a desire to add an additional qualifying filtering criterion for the secondary object type (e.g., in response to a user selecting or otherwise manipulating the button 606), the virtual application 128 and/or application platform 110 may present or otherwise display one or more GUI elements 702, 704, 706 to enable a user to provide an additional filtering criterion to qualify the "activity" object type. As illustrated in FIG. 7, in response a user manipulating or otherwise selecting the drop-down list element 702, the virtual application 128 may present or otherwise display a drop-down menu 708 that lists each of the fields associated with an "activity" object that may be utilized to qualify the "activity" objects. In this regard, FIG. 7 illustrates the state of the display 300 after a user has selected or otherwise indicated the "task" field 710 from the drop-down menu 708 as the desired field of the "activity" objects 126 to be utilized by the object filtering process 200.

In response a user manipulating or otherwise selecting the drop-down list element 704, the virtual application 128 may present or otherwise display a drop-down menu 802 that lists each of the possible operators that may be utilized to limit the selected field to a particular value (or a range thereof), such as, for example, less than, greater than, less than or equal to, greater than or equal to, equal to, not equal to, and the like. In this regard, FIG. 8 illustrates the state of the display 300 after a user has selected or otherwise indicated "equals" as the desired operator for qualifying the value in the "task" field of the "activity" objects to be utilized by the object filtering process 200. The text box element 706 is utilized by the user to provide the desired value to be used to qualify the selected field. For example, a user may manipulate a user interface, such as a keyboard, to enter "true" in the text box element 706 as the desired value for the "task" field of the "activity" objects 126. In other embodiments, in lieu of text box element 706, the object filtering process 200 may present a drop-down list element to select from possible values for the selected field (e.g., possible values for the "task" field of an "activity" object). In this regard, it should be noted that the subject matter is not intended to be limited to any particular type of GUI elements for limiting the selected field, and in practice, the GUI elements will vary depending on the field selected by the user. For example, if the user selects a date field using the drop-down list element 702, in lieu of the drop-down list element 704 and text box element 706, the object filtering process 200 may update the display 300 to include date picker elements or other GUI elements to select and limit the date field to a particular range of dates.

Referring now to FIGS. 8-9, although additional filtering criteria may be added to further qualify the secondary object type, in the illustrated embodiment, after creating the qualifying filtering criterion, a user may activate, select, or otherwise manipulate button 412 to complete execution of the object filtering process 200. In this example, the data processing engine 112 and/or query generator 114 query the database 130 to identify or otherwise select all of the "opportunity" objects available to the virtual application 128 that are not associated with an "activity" object having a value for its associated "task" field that is equal to "true" to create the filtered set of "opportunity" objects. For example, the data processing engine 112 and/or query generator 114 may identify all of the "opportunity" objects available to the virtual application 128 to obtain an initial set of "opportunity" objects, and then remove any "opportunity" objects that are associated with an "activity" object having a "task" field value of "true" to obtain the filtered set of "opportunity" objects. Conversely, if the user were to select the associative filtering operation (e.g., the "with" filtering operation) as the desired filtering operation, the data processing engine 112 and/or query generator 114 would query the database 130 identify all of the "opportunity" objects available to the virtual application 128 that are associated with an "activity" object having a "task" field value of "true" for inclusion in the filtered set of "opportunity" objects. After evaluating all of the objects 126 available to the virtual application 128 to obtain the filtered set of objects 126, the application platform 110 and/or virtual application 128 provides a report 900 to the user in the lower portion 304 of the display 300. In the illustrated embodiment, the report 900 is realized as a table displayed in the lower portion 304 of the display 300 presented by the virtual application 128 within the client program 142 that includes only "opportunity" objects that are not associated with an "activity" object having a "task" field equal to "true". As illustrated, the tabular report 900 may include columns corresponding to various fields of the "opportunity" objects that may be used to sort the cross filtered set of "opportunity" objects in a desired manner. It will be appreciated that the report 900 may be formatted or otherwise delimited in a wide variety of manners, and the subject matter described herein is not intended to be limited to any particular format for the report 900. As illustrated, the upper portion 302 of the display 300 may be updated to reflect the filtering criteria and filtering operation that were applied to obtain the report 900 presented in the lower portion 304 of the display 300.

Referring again to FIG. 2, and with continued reference to FIG. 1 and FIGS. 3-9, depending on the embodiment, the object filtering process 200 may repeated one or more times to combine cross filters as desired by the user of the client device 140. For example, a user of a CRM application may desire to view a report containing "account" objects that have an associated "opportunity" object but do not have an associated "activity" object. The user may begin by manipulating a button (e.g., button 306) to add a first cross filter, and manipulate subsequently presented user interface elements (e.g., drop-down lists 402, 404, 406 and button 412) to define the first cross filter as "accounts" "with" "opportunities" in a similar manner as set forth above in the context of FIGS. 3-6 (e.g., tasks 202, 204, 206, 208). After determining that there are no additional filtering criterion desired (e.g., in response to the user manipulating or otherwise activating button 412), the object filtering process 200 queries the database 130 to identify all of the "account" objects available to the virtual application 128 that are associated with an "opportunity" object, and presents a report of those "account" objects on the client device 140 in a similar manner as set forth above (e.g., tasks 212, 214, 216). After defining the first cross filter, the user may subsequently manipulate the button (e.g., button 306) to add a second cross filter, and manipulate subsequently presented user interface elements (e.g., drop-down lists 402, 404, 406 and button 412) to define the second cross filter as "opportunities" "without" "activities" in a similar manner as set forth above (e.g., tasks 202, 204, 206, 208). After determining that there are no additional filtering criterion desired (e.g., in response to the user manipulating or otherwise activating button 412), the object filtering process 200 selects or otherwise identifies, from the previously filtered subset of objects, all of the "account" objects that are not associated with an "activity" object, and updates the display on the client device 140 to present a report that includes only those "account" objects having opportunities but no activity (e.g., tasks 212, 214, 216).

It should be noted that various possible combinations of cross filters may be implemented by a user to achieve a desired report. Additionally, it should be noted that the cross filters operations may be applied in various different manners to achieve a desired logical combination of cross filters. For example, in response to the user manipulating button 306 to add a second cross filter, the object filtering process 200 may present or otherwise display one or more GUI elements adapted to allow the user to define the logical relationship between the first cross filter and the second cross filter. For example, as described above, the cross filters may be combined to perform a logical conjunction operation (or logical "AND" operation), such that the report presented to the user contains only objects that satisfy both cross filters (e.g., only "account" objects that are associated with an "opportunity" object and also are not associated with an "activity" object). In other embodiments, the cross filters may be combined to perform a logical disjunction operation (or logical "OR" operation), such that the report presented to the user contains only objects that satisfy either cross filter (e.g., "account" objects that are associated with an "opportunity" object and "account" objects that are not associated with an "activity" object). Accordingly, the subject matter described herein is not intended to be limited to any particular logical relationship between multiple cross filters.

Additionally, it should be noted that in some embodiments, one or more filtering criteria may be utilized to qualify the primary object type in a similar manner as described above in the context of qualifying the secondary object type (e.g., task 210). In such embodiments, the object filtering process 200 may present or otherwise display one or more GUI elements adapted to allow the user to limit or otherwise qualify the primary object type across one or more fields associated therewith. For example, referring to the exemplary embodiment described above in the context of FIGS. 4-9, a user may manipulate one or more GUI elements to qualify a "stage" field of the "opportunity" objects to being equal to "prospecting." When the user manipulates button 412 to complete execution of the object filtering process 200, the data processing engine 112 and/or query generator 114 query the database 130 to identify or otherwise select all of the "opportunity" objects available to the virtual application 128 having a "stage" equal to "prospecting" to obtain an initial set of "opportunity" objects, and then remove any "opportunity" objects from that initial set that are associated with an "activity" object having a "task" field value of "true" to obtain the filtered set of "opportunity" objects in the "prospecting" stage that are not associated with an "activity" having a "task" of "true." Again, there are various manners in which the primary object type may be qualified, and the subject matter described herein is not intended to be limited to any particular implementation.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Thus, although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of filtering a plurality of objects associated with a virtual application in a system including a database maintaining the plurality of objects, the method comprising:
    providing a first graphical user interface element enabling indication of a first object type of a plurality of object types supported by the virtual application, each object type of the plurality of object types defining respective fields associated with one or more objects of the plurality of objects having that respective object type, wherein values for the respective fields of one or more objects of the plurality having the first object type are maintained as metadata in the database;
    providing a second graphical user interface element enabling indication of a second object type of a second plurality of object types supported by the virtual application, each object type of the second plurality being capable of being associated with the first object type indicated by the first graphical user interface element, and each object type of the second plurality of object types defining respective fields associated with one or more objects of the plurality of objects having that respective object type, wherein values for the respective fields of one or more objects of the plurality having the second object type are maintained as metadata in the database;
    providing a third graphical user interface element enabling indication of a dissociative filtering operation from a plurality of possible filtering operations; and
    after indication of the dissociative filtering operation, the first object type and the second object type, identifying a filtered set of objects of the first object type, wherein:
        the filtered set comprises a subset of the plurality of objects available to the virtual application that have the first object type; and
        each object of the subset is not associated with another object of the plurality of objects having the second object type.

2. The method of claim 1, further comprising presenting at least a portion of the filtered set of objects within the virtual application, the virtual application being accessed by a client device over a network, wherein:
    providing the first graphical user interface element comprises displaying the first graphical user interface element within the virtual application on the client device;

providing the second graphical user interface element comprises displaying the second graphical user interface element within the virtual application on the client device; and presenting at least the portion of the filtered set of objects comprises displaying at least the portion of the filtered set of objects within the virtual application on the client device.

3. The method of claim 1, further comprising providing a fourth graphical user interface element to enable provision of a qualifying filtering criterion for a field of the second object type, wherein identifying the filtered set of objects of the first object type comprises selecting the filtered set of objects of the first object type based on the qualifying filtering criterion for the field of the second object type.

4. The method of claim 3, the qualifying filtering criterion comprising a specified value for the field of the second object type, wherein selecting the filtered set of objects comprises removing, from an initial subset of the plurality of objects of the first object type, each respective object that is associated with an object of the secondary object type having a value for the field that is equal to the specified value.

5. The method of claim 3, the qualifying filtering criterion comprising a specified range of values for the field of the second object type, wherein selecting the filtered set of objects comprises removing, from an initial subset of the plurality of objects of the first object type, each respective object that is associated with an object of the secondary object type having a value for the field that is within the specified range.

6. The method of claim 1, wherein identifying the filtered set of objects comprises a server:

querying the database to select all of the plurality of objects available to the virtual application that have the first object type; and removing any of the selected objects that are associated with another object of the plurality of objects having the second object type to obtain the filtered set.

7. The method of claim 6, further comprising the server providing a report in a portion of a display presented by the virtual application within a client program on the client device, wherein the report includes objects of the filtered set and columns corresponding to the fields associated with the first object type.

8. The method of claim 1, further comprising providing a fourth graphical user interface element to enable provision of a qualifying filtering criterion for a field of the second object type, wherein identifying the filtered set of objects comprises selecting, from the plurality of objects, each object of the first object type that is not associated with an object of the second object type that has a value for the field that satisfies the qualifying filtering criterion.

9. The method of claim 1, wherein the second plurality of object types comprises possible object types capable of being associated with the first object type based on object-association fields of the first object type.

10. The method of claim 1, wherein each respective object type of the plurality of object types defines the structure of a respective object of the plurality of objects having that respective object type, wherein the respective object type defines a structure of the respective object and the fields associated with the respective object.

11. The method of claim 1, wherein for each respective object of the plurality of objects, information pertaining to its respective object type of the plurality of object types is maintained as metadata in the database.

12. The method of claim 1, wherein the dissociative filtering operation comprises a without filtering operation.

13. The method of claim 1, wherein identifying the filtered set of objects of the first object type comprises removing, from an initial subset of the plurality of objects of the first object type, each respective object that is associated with an object of the secondary object type.

14. A computer system comprising a processor and a memory, wherein the memory comprises computer-executable instructions that, when executed by the processor, cause the computer system to:

provide a first graphical user interface element to enable selection of a first object type of a plurality of object types for a plurality of objects maintained by the computer system in a database, each object type of the plurality of object types defining respective fields associated with one or more objects of the plurality of objects having that respective object type, wherein values for the respective fields of one or more objects of the plurality having the first object type are maintained as metadata in the database;

provide a second graphical user interface element to enable selection of a second object type of a second plurality of object types for the plurality of objects, each object type of the second plurality being capable of being associated with the first object type indicated by the first graphical user interface element, and each object type of the second plurality of object types defining respective fields associated with one or more objects of the plurality of objects having that respective object type, wherein values for the respective fields of one or more objects having the second object type are maintained as metadata in the database;

provide a third graphical user interface element to enable selection of a dissociative filtering operation from a plurality of possible filtering operations; and after indication of the dissociative filtering operation, identify a filtered subset of the plurality of objects having the first object type, wherein each object of the filtered subset has the first object type and is not associated with another object having the second object type.

15. The computer system of claim 14, wherein the computer-executable instructions cause the computer system to generate a virtual application, the plurality of objects being associated with the virtual application.

16. The computer system of claim 15, wherein the virtual application comprises a customer relationship management application.

17. The computer system of claim 15, the virtual application being provided to a client device over a network, wherein the computer-executable instructions cause the computer system to display the first graphical user interface element, the second graphical user interface element, and the third graphical user interface element within the virtual application on the client device.

18. The computer system of claim 15, the virtual application being provided to a client device over a network, wherein the computer-executable instructions cause the computer system to display at least a portion of the filtered subset on the client device.

19. A method of filtering a plurality of objects associated with a virtual application provided to a client device over a network, the virtual application being created based on data from a database, the plurality of objects being maintained in the database, the method comprising:

providing a first graphical user interface element within the virtual application, the first graphical user interface element enabling selection of a first object type of a plurality of object types for the plurality of objects, each object type of the plurality of object types defining respective fields associated with one or more objects of the plurality of objects having that respective object type, wherein values for the respective fields of one or more objects of the plurality having the first object type are maintained as metadata in the database;

providing a second graphical user interface element within the virtual application, the second graphical user interface element enabling selection of a second object type of a second plurality of object types for the plurality of objects, each object type of the second plurality being capable of being associated with the first object type selected by the first graphical user interface element, and each object type of the second plurality of object types defining respective fields associated with one or more objects of the plurality of objects having that respective object type, wherein values for the respective fields of the one or more objects of the plurality having the second object type are maintained as metadata in the database;

providing a third graphical user interface element within the virtual application, the third graphical user interface element enabling selection of a dissociative filtering operation from a plurality of possible filtering operations; and after selection of the first object type, the second object type, and the dissociative filtering operation:
identifying a filtered subset of the plurality of objects having the first object type based on the second object type and the dissociative filtering operation, wherein:
each object of the filtered subset is not associated with another object of the plurality of objects having the second object type; and
presenting at least a portion of the filtered subset within the virtual application.

20. The method of claim 19, further comprising providing a fourth graphical user interface element within the virtual application, the fourth graphical user interface element enabling selection of a third filtering criterion to qualify objects of the second object type, wherein identifying the filtered subset comprises selecting each object of the plurality of objects of the first object type that is not associated with another object of the plurality of objects having the second object type that satisfies the third filtering criterion.

* * * * *